(12) United States Patent
Sayama et al.

(10) Patent No.: US 9,533,284 B2
(45) Date of Patent: Jan. 3, 2017

(54) VISIBLE-LIGHT-RESPONSIVE PHOTOCATALYST WITH ENVIRONMENTAL RESISTANCE

(75) Inventors: Kazuhiro Sayama, Ibaraki (JP); Yoshinari Konishi, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 13/985,372

(22) PCT Filed: Feb. 15, 2012

(86) PCT No.: PCT/JP2012/053538
§ 371 (c)(1),
(2), (4) Date: Aug. 14, 2013

(87) PCT Pub. No.: WO2012/111709
PCT Pub. Date: Aug. 23, 2012

(65) Prior Publication Data
US 2013/0324393 A1    Dec. 5, 2013

(30) Foreign Application Priority Data

Feb. 16, 2011  (JP) .................................. 2011-030782
Sep. 7, 2011   (JP) .................................. 2011-194770

(51) Int. Cl.
| | | |
|---|---|---|
| *B01J 23/34* | (2006.01) | |
| *C11D 3/00* | (2006.01) | |
| *C11D 3/12* | (2006.01) | |
| *B01J 23/30* | (2006.01) | |
| *B01J 23/31* | (2006.01) | |
| *B01J 37/08* | (2006.01) | |
| *B01J 35/00* | (2006.01) | |
| *B01J 37/02* | (2006.01) | |
| *B01J 23/888* | (2006.01) | |
| *B01J 23/89* | (2006.01) | |
| *C23C 18/12* | (2006.01) | |
| *B01D 53/86* | (2006.01) | |

(52) U.S. Cl.
CPC ................. *B01J 23/34* (2013.01); *B01J 23/30* (2013.01); *B01J 23/31* (2013.01); *B01J 23/888* (2013.01); *B01J 23/8993* (2013.01); *B01J 35/004* (2013.01); *B01J 37/0201* (2013.01); *B01J 37/088* (2013.01); *C11D 3/0063* (2013.01); *C11D 3/1213* (2013.01); *B01D 53/8668* (2013.01); *B01D 2255/206* (2013.01); *B01D 2255/2045* (2013.01); *B01D 2255/2063* (2013.01); *B01D 2255/2073* (2013.01); *B01D 2255/20761* (2013.01); *B01D 2255/20776* (2013.01); *B01D 2255/20792* (2013.01); *B01D 2257/708* (2013.01); *C23C 18/1216* (2013.01)

(58) Field of Classification Search
CPC ............. B01J 23/34; B01J 23/30; B01J 23/31; C23C 18/1216
USPC ............... 502/311, 303, 306, 318, 319, 305; 427/126.3, 205, 216, 217, 255.19, 564, 427/576, 584, 597
See application file for complete search history.

(56) References Cited

U.S. PATENT DOCUMENTS

| | | | |
|---|---|---|---|
| 2010/0204041 A1 | 8/2010 | Nakano et al. | |
| 2010/0292075 A1 | 11/2010 | Nakano et al. | |
| 2011/0212832 A1* | 9/2011 | Nakano ................... | A61L 2/232 502/305 |

FOREIGN PATENT DOCUMENTS

| | | |
|---|---|---|
| CN | 101204652 A | 6/2008 |
| CN | 101224419 A | 7/2008 |
| CN | 101767002 | 7/2010 |
| CN | 101795767 A | 8/2010 |
| EP | 1676890 | 10/2004 |
| EP | 2537583 | 12/2012 |
| JP | 2000-095976 | 4/2000 |
| JP | 2000-095977 | 4/2000 |
| JP | 2001-137711 | 5/2001 |
| JP | 2008-149312 | 7/2008 |
| JP | 2009-189952 | 8/2009 |
| JP | 2009-202151 | 9/2009 |
| JP | 2009-254954 | 11/2009 |
| JP | 2012-091143 | 5/2012 |
| KR | 10-2008-0055700 | 6/2008 |
| TW | 200940168 | 10/2009 |
| WO | 2011013850 A | 2/2011 |

OTHER PUBLICATIONS

JP 2009254954 (Machine Translation).*
M. Ashokkumar et al., Preparation and Characterization of Doped WO3 Photocatalyst Powders, Journal of Materials Science Letters, vol. 24, No. 6, pp. 2135-2139 (1989).
Wang et al., "Doping of Nb2O5 in Photocatalytic Nanocrystalline/ Nanoporous WO3 Films," Thin Solid Films, Feb. 2001, pp. 68-72, vol. 388, No. 1-2.

* cited by examiner

*Primary Examiner* — Matthew E Hoban
*Assistant Examiner* — James Fiorito
(74) *Attorney, Agent, or Firm* — Carmody Torrance Sandak & Hennessey LLP (57) ABSTRACT

To provide a novel visible light-responsive photocatalyst or tungsten oxide visible light-responsive semiconductor improved in environmental resistance under an alkaline condition. The tungsten oxide visible light-responsive semiconductor unstable under an alkaline condition is improved in environmental resistance without losing photocatalytic function thereof by adding thereto at least one element selected from the group consisting of copper, tantalum, niobium, lanthanum, bismuth, calcium, chromium, manganese and zinc. The obtained environmental resistant visible light-responsive photocatalyst is subjected to an alkaline treatment to thereby be improved in photocatalytic activity.

10 Claims, 5 Drawing Sheets

VISIBLE-LIGHT-RESPONSIVE PHOTOCATALYST WITH ENVIRONMENTAL RESISTANCE

CROSS REFERENCE TO RELATED APPLICATIONS

This application is a National Stage of International Application No. PCT/JP2012/053538, filed Feb. 15, 2012, which claims priority to Japanese Patent Application No. 2011-030782, filed Feb. 16, 2011 and Patent Application No. 2011-194770, filed Sep. 7, 2011, the subject matter which is hereby incorporated by reference.

TECHNICAL FIELD

The present invention relates to a novel visible light-responsive photocatalyst having environmental resistance.

BACKGROUND ART

Photocatalysts responsive to sunlight or indoor light to adsorb, decompose, and remove environmental contaminants, or exhibit a self-cleaning action to the dirt adhering to surfaces of objects have received attention these days, and have been studied energetically. Titanium oxide is one of the typical photocatalysts, and exhibits strong photocatalytic activity. Titanium oxide, however, has a large bandgap and has no absorbing properties to visible light that constitutes most of the sunlight. Titanium oxide exhibits photocatalytic activity by ultraviolet light, but does not exhibit activity by visible light. For this reason, titanium oxide cannot sufficiently utilize sunlight. Additionally, titanium oxide does not function in indoor situations having extremely weak ultraviolet light.

As measures against these problems, studies have been conducted to improve titanium oxide by doping titanium oxide with nitrogen or the like to enable absorption of visible light by titanium oxide. Further, studies have been conducted to search for novel oxide semiconductors other than titanium oxide that are responsive to visible light to exhibit activity as a photocatalyst. It is also known that visible light-responsive semiconductor compounds such as tungsten oxide have a smaller bandgap than that of titanium oxide and can absorb visible light, and such visible light-responsive semiconductor compounds work efficiently as a visible light-active photocatalyst (visible light-responsive photocatalyst) by adding a proper cocatalyst such as CuO, $CuBi_2O_4$, copper ion, platinum, and palladium or carrying the cocatalyst on the surfaces of the visible light-responsive semiconductor compounds (PTL 1, for example).

Unfortunately, many of these semiconductor compounds and cocatalysts are unstable substances under a severe condition such as alkaline or acidic conditions, and have limitation in the range of application. For example, tungsten oxide is easily dissolved under an alkaline condition, and cannot be used as it is in places such as sinks in which alkaline detergents are used. For this reason, a visible light-responsive photocatalyst stable under alkaline and acidic conditions has been desired for use in various applications for kitchens and bathrooms in houses.

To use such substances stably under the alkaline and acidic conditions, various studies have been conducted in the related art. For example, to form a photocatalyst layer having high alkali resistance on the surface of a base material, a method is reported in which a primary coating is formed on the base material using a resin containing a compound such as zirconium, titanium, and aluminum; an intermediate layer is further formed using a composition containing a compound of zirconium, titanium, or the like; on the intermediate layer, a photocatalyst layer is formed using a composition containing a photocatalyst particle and a zirconium compound as a binder; thereby, the photocatalyst layer is prevented from peeling off from the base material (PTL 2). Moreover, for improving the alkali resistance of an antibacterial photocatalytic coating material, a method in which polyorganosiloxane and an acrylic polymer are added to an aqueous coating material containing a photocatalyst to form a composite material, and a method in which a photocatalyst dry powder is contained in an acrylic silicon coating material are reported (PTLs 3 and 4).

These are methods in which a base material surface or a photocatalyst is coated with a stable substance to protect the base material surface or the photocatalyst from an alkali. For a photocatalytic reaction, however, holes and electrons generated by irradiation with light need to reach the outer surface. Additionally, the holes need to decompose a reaction substrate such as organic substances by oxidation, and the electrons need to be consumed by reduction of oxygen in the air. If the photocatalyst is protected with such a coating, the holes and the electron both have to pass through a newly coated protecting substance layer and react with the substrate and oxygen on the surface thereof. For this reason, charge separation is not promoted efficiently, and therefore the holes and the electrons are undesirably recombined and the reactivity of the surface of the coating substance is reduced, which result in problems such as undesirably reduced photocatalytic activity. Further, a complex process for coating is needed, which increases cost. Moreover, a desired coating structure according to the purpose of application cannot be easily obtained.

CITATION LIST

Patent Literature

PTL 1: National Institute of Advanced Industrial Science and Technology et al., Japanese Patent Application Laid-Open (JP-A) No. 2008-149312
PTL 2: Yamaha Livingtec Corporation, JP-A No. 2001-137711
PTL 3: TOTO LTD., JP-A No. 2000-95976
PTL 4: TOTO LTD., JP-A No. 2000-95977

SUMMARY OF INVENTION

Technical Problem

An object of the present invention is to provide a novel visible light-responsive photocatalyst in which a visible light-responsive semiconductor itself has improved environmental resistance under an alkaline condition.

Solution to Problem

As a result of extensive research to solve the above problems, the present inventors have found that by adding another element to the visible light-responsive semiconductor which is unstable under an alkaline condition, the environmental resistance of the visible light-responsive semiconductor can be improved without losing a photocatalytic function to visible light. Thus, the problems have been solved. Specifically, by adding at least one element selected from the group consisting of copper, tantalum, niobium, lanthanum, bismuth, calcium, chromium, manganese and zinc to tungsten oxide unstable under an alkaline condition, its environmental resistance under the alkaline condition was successfully improved without losing the photocatalytic function. Further, it has been found that when bismuth is added, photocatalytic activity is improved depending on the condition.

The present inventors have also found that photocatalytic activity is improved by further subjecting to an alkaline treatment the photocatalyst prepared by adding to tungsten oxide at least one element selected from the group consisting of copper, tantalum, niobium, lanthanum, bismuth, calcium, chromium, manganese, and zinc.

Namely, this application provides the following inventions.

<1> A method for improving environmental resistance of tungsten oxide under an alkaline condition without losing photocatalytic function thereof caused by visible light, the method including:
adding to tungsten oxide at least one element selected from the group consisting of copper, tantalum, niobium, lanthanum, bismuth, calcium, chromium, manganese and zinc.

<2> The method according to <1>, wherein an amount of the at least one element added is 0.005 to 0.50 in terms of a molar ratio to tungsten.

<3> The method according to <2>, wherein the amount of the at least one element added is 0.01 to 0.15 in terms of the molar ratio to tungsten.

<4> A tungsten oxide visible light-responsive photocatalyst,
wherein the tungsten oxide visible light-responsive photocatalyst is improved in environmental resistance by the method according to any one of <1> to <3>.

<5> The method according to any one of <1> to <3>, wherein the at least one element contains bismuth, and the method further includes burning the tungsten oxide at 400° C. to 700° C. to improve photocatalytic activity thereof.

<6> A tungsten oxide visible light-responsive photocatalyst,
wherein the tungsten oxide visible light-responsive photocatalyst is improved in environmental resistance and photocatalytic activity by the method according to <5>.

<7> A method for improving environmental resistance of tungsten oxide under an alkaline condition without losing photocatalytic function thereof caused by visible light and for improving photocatalytic activity of tungsten oxide, the method including:
adding to tungsten oxide at least one element selected from the group consisting of copper, tantalum, niobium, lanthanum, bismuth, calcium, chromium, manganese and zinc; and
subjecting a product obtained in the adding to an alkaline treatment to improve photocatalytic activity thereof.

<8> A tungsten oxide visible light-responsive photocatalyst,
wherein the tungsten oxide visible light-responsive photocatalyst is improved in photocatalytic activity by the method according to <7>.

Advantageous Effects of Invention

Tungsten oxide is a visible light-responsive photocatalyst stable under an acidic condition. According to the present invention, a novel tungsten oxide visible light-responsive photocatalyst which is stable also under an alkaline condition and has environmental resistance is provided.

The novel visible light-responsive photocatalyst according to the present invention is stable under the alkaline and acidic conditions, and can be used in the alkaline and acidic environments such as sinks, bathrooms, and toilets in which the visible light-responsive photocatalyst is exposed to detergents and bleaching agents, for example. These facilities are mostly provided indoors and, therefore, when the photocatalyst products are used in these facilities, the photocatalyst action to be caused by ultraviolet light from the sun cannot be expected. For this reason, a visible light-responsive photocatalyst that functions under indoor visible light is needed. Improving environmental resistance by the present invention makes it possible to use the tungsten oxide visible light-responsive photocatalyst in these facilities, which has been impossible hitherto. By using the tungsten oxide according to the present invention, even if the surface of tungsten oxide is contaminated by organic substances, dirt can be decomposed and removed by a self-cleaning function attributed to the photocatalyst action of tungsten oxide, and the surface of tungsten oxide can be kept clean.

REFERENCE SIGNS LIST

1 Inside of visible light-responsive photocatalyst
2 Surface in which environmental resistance is enhanced by addition
3 Adsorption substance to be decomposed
4 Cocatalyst
5 Hole
6 Excited electron

DESCRIPTION OF EMBODIMENTS

Figure 1:
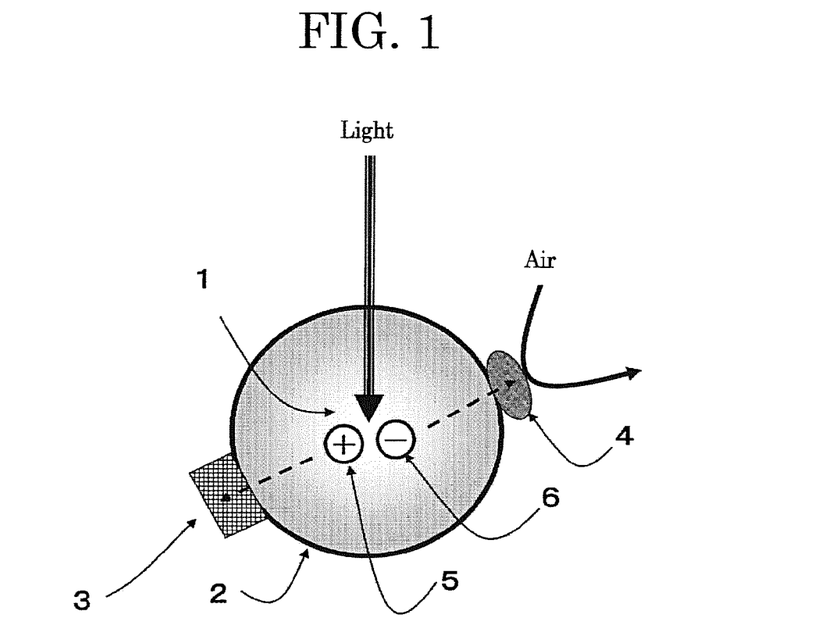
FIG. 1 is a conceptual diagram of a visible light-responsive photocatalyst having environmental resistance improved by adding an element other than a visible light-responsive semiconductor to the visible light-responsive semiconductor.

In the present invention, environmental resistance is improved by adding an element stable under an alkaline condition to a visible light-responsive semiconductor unstable under an alkaline condition. It is thought that as shown in the schematic diagram in FIG. 1, by adding the element stable under an alkaline condition, at least the surface of the visible light-responsive semiconductor became to have a structure stable under an alkaline condition; thereby, the entire visible light-responsive semiconductor that has been unstable is protected, and its environmental resistance is improved. The visible light-responsive photocatalyst according to the present invention can be used in combination with an environment-resistant cocatalyst. Particularly when organic substances are to be completely decomposed by oxidation, a cocatalyst to promote reduction of oxygen is preferably carried. For the cocatalyst, noble metals such as platinum and palladium and copper compounds are used because these metals promote reduction of oxygen. The cocatalyst may be carried on the outer surface of a semiconductor film or an inside or bottom of a porous film.

Further, a substance having environmental resistance and high reactivity with holes on the surface, such as titanium oxide, can also be used for coating the outer surface of the visible light-responsive photocatalyst according to the present invention. In such a case, a synergistic effect of the substance and the visible light-responsive photocatalyst according to the present invention can be expected.

The photocatalytic activity of tungsten oxide to which the other element has been added to improve environmental resistance is further improved by performing an alkaline treatment, for example, immersing tungsten oxide in a sodium hydroxide aqueous solution or the like for a predetermined period of time. The concentration of the alkali to be used for treatment and the treatment time vary according to the kind and amount of the element to be added, the form of tungsten oxide, and the like. For this reason, the alkaline treatment needs to be properly performed under the optimal condition. Usually, when the sodium hydroxide aqueous solution is used for the treatment, the concentration is desirably 0.01 M to 3.0 M, and more desirably 0.1 M to 2.0 M, and the time for an immersion treatment is from 10 minutes to 10 hours, and more desirably from 30 minutes to 6 hours.

The detailed structure of the surface having improved environmental resistance is unclear at present, but it is thought that there is the following possibility. It is thought that the entire visible light-responsive semiconductor is doped with the added element, and the doped structure also has high stability in an alkaline condition, therefore improving environmental resistance. In this case, it is thought that, because the original visible light-responsive semiconductor occupies a larger proportion with respect to the added element in the entire doped structure, the original photocatalytic function is not lost.

For another possibility, it is thought that a portion of the structure of the original visible light-responsive semiconductor containing no element added remains inside of the newly generated photocatalyst to keep the photocatalytic function, while the added element has a large proportion in the vicinity of the surface of the original visible light-responsive semiconductor, and the added element forms a composite compound such as composite oxide together with the component in the original semiconductor and acts to protect the original semiconductor from external environments. In this case, at least on the surface in which environmental resistance is improved, holes and electrons generated by the photocatalytic function need to easily react with the reaction substrate and oxygen in the air, respectively. When the original visible light-responsive semiconductor structure remains inside of the doped structure, for example, absorption of light and generation of holes and electrons may occur inside of the doped structure. In such a case, the holes and electrons generated inside of the doped structure move to the surface of the doped structure and make a reaction.

For further another possibility, it is thought that the visible light-responsive semiconductor particle becomes larger by the influence of the added element to reduce the specific surface area, and, as a result, is difficult to dissolve also in an alkaline environment. When the primary particle of the visible light-responsive semiconductor becomes larger by addition of the element, a particle formed by aggregation of the primary particle also has a reduced surface area; therefore, the particle is difficult to dissolve.

It is also thought that these factors as a whole make contribution to improvement in environmental resistance under an alkaline condition in a combined manner.

Hereinafter, a method for improving the environmental resistance of tungsten oxide that dissolves under an alkaline condition, without losing the photocatalytic function, which includes adding copper when tungsten oxide is produced by a PA method (pyrolysis method of peroxide) will be described. As shown below, the present invention will not be limited to specific production methods.

First, a tungsten-containing material such as tungsten acid or metal tungsten is dissolved in a hydrogen peroxide solution, and the solution is dried. The obtained white crystal is dissolved again with water. While stirring and heating on a hot stirrer, the solution is aged to generate polytungsten peroxide having a deep orange color. Copper nitrate is added to polytungsten peroxide such that the amount of copper to be added is a predetermined amount, and burning is performed to obtain tungsten oxide to which copper is added. Thus, the present invention can be implemented by a simple method of adding a copper compound in the production process of tungsten oxide.

The tungsten oxide being obtained by the present method and having copper added thereto has improved environmental resistance under an alkaline condition, and does not lose the photocatalytic function to be caused by visible light.

The proportion of copper to be added at this time is desirably 0.005 to 0.50 and more desirably 0.01 to 0.15 in terms of the molar ratio to tungsten (Cu/W molar ratio), but a required degree of improvement in environmental resistance varies according to the purpose and condition of use of the photocatalyst. For this reason, the proportion of copper to be added is properly determined according to situations. A preferable amount of the element to be added also varies according to the element to be added and an addition method thereof.

Considering the case where some other element is added by some method during the production process to improve the environmental resistance of the compound exhibiting photocatalytic activity, usually, it is thought that an excessively small amount of the other element to be added does not sufficiently improve environmental resistance; an excessively large amount of the other element to be added sufficiently improves environmental resistance but significantly reduces or eliminates the photocatalytic function. Generally, when the amount of the other element to be added is increased, it is very likely supposition that the photocatalytic function is completely lost before environmental resistance is improved by an extent as needed. The present inventors have, however, found that when the elements described herein such as copper is added alone or in combination during the production process of tungsten oxide, environmental resistance under an alkaline condition can be improved without losing the photocatalytic function of tungsten oxide. Thus, the present invention has been made.

The present inventors also found that by adding the specific element such as bismuth to tungsten oxide on a predetermined condition, not only environmental resistance but also photocatalytic activity is more improved than that of tungsten oxide having no specific element added.

Further, the environmental resistance of the substance unstable under an alkaline condition is not always improved simply by adding the element stable under an alkaline condition. For tungsten oxide, the environmental resistance is not improved every time when the element stable under an alkaline condition is added to improve environmental resistance under an alkaline condition (see Comparative Example 6 described below). In the present invention, the environmental resistance of tungsten oxide can be improved by adding the elements described herein such as copper alone or in combination. Thus, the combination of tungsten oxide with these elements according to the present invention is a particularly effective solution to the problems described above.

In the present invention, it has been found that environmental resistance can be improved without losing the photocatalytic function even if a specific addition method is changed to other methods. This is probably because the same structure is finally generated by adding copper to tungsten oxide during the production process of the photocatalyst, even if the production method is different. As shown in Examples below, tungsten oxide can be produced by various photocatalyst production methods such as a PA method, an IE method (ion exchange method) and a complex polymerization method, and any of these methods can be used to add copper according to the present invention. In these production methods, addition of copper can be achieved by mixing a precursor of tungsten oxide with a metal salt of copper and then burning the mixture. Usually, the burning temperature may be the same as that in the case where simple tungsten oxide is produced by these methods. The burning temperature is desirably 400° C. to 900° C., and more desirably 500° C. to 800° C. Further, the present invention can be implemented by impregnating a tungsten oxide powder sample with a metal coating solution of copper and burning the powder sample. In this case, copper added to the surface of the powder needs to be mixed with tungsten oxide at an atomic level by burning. For this reason, burning needs to be performed at a relatively high temperature. Thus, the burning temperature is desirably 600° C. to 900° C., and more desirably 750° C. to 850° C. Generally, an element other than copper can be added by using these various production methods in the same manner, but the condition such as a preferable burning temperature depends on the element to be added. Moreover, the present invention can be implemented by a method in which the precursor solution or the like as described above is applied onto a substrate, and the workpiece is burned to make a tungsten oxide thin film; then, a metal coating solution containing an element to be added is applied onto the obtained film, and the coated film is further burned. When the thin film has such a form, the burning temperature is generally different from the burning temperature in the case of the powder form, although the burning temperature depends on the kind of elements to be added. The burning temperature is desirably 400° C. to 600° C., and more desirably 450° C. to 550° C. In such a case, the upper limit of the burning temperature is often determined according to the upper limit of the heat resistance of the substrate. When the substrate is highly heat resistant, burning at a high temperature of approximately 900° C. can be performed.

EXAMPLES

Hereinafter, with specific Examples, the present invention will be described more in detail.

<Improvement in Environmental Resistance Under Alkaline Condition by Adding Copper>

Example 1 and Comparative Example 1

PA Method

A visible light-responsive copper-added tungsten oxide photocatalyst was prepared by the following PA method as Example 1 in which copper stable under an alkaline condition was added at 0.13 in terms of the molar ratio to tungsten (Cu/W molar ratio) to tungsten oxide that dissolved under an alkaline condition. Moreover, as Comparative Example 1, tungsten oxide was produced by the same method as above except that no copper was added.

Metal tungsten was dissolved in a hydrogen peroxide solution, and the solution was dried. The obtained product was dissolved with water again. While further stirring and heating on a hot stirrer, the solution was aged. The solution became a transparent yellow solution. Then, polytungsten peroxide having a dark orange color was generated. Next, copper nitrate was added in an amount that the molar ratio of copper to tungsten (Cu/W molar ratio) was 0.13. Polytungsten peroxide generated by this operation and having copper added thereto was burned at 800° C. Thereby, tungsten oxide in Example 1 having copper added thereto was obtained.

The powder of Example 1 (tungsten oxide having copper added thereto at 0.13 in terms of the molar ratio to tungsten (Cu/W molar ratio)) and the powder of Comparative Example 1 (tungsten oxide having no copper added) each were put into a 1.0 M sodium hydroxide aqueous solution, and left over 2 hours. Then, change in the solution was visually observed. As a result, 90% or more of the powder of Comparative Example 1 dissolved, but no apparent change was found in Example 1. Apparently, by adding copper, the environmental resistance of tungsten oxide under an alkaline condition was improved in Example 1.

Example 2 and Comparative Example 2

IE Method

The method for preparing a copper-added tungsten oxide photocatalyst was changed to the IE method described below in Example 2. Via an ion exchange resin, 20 mL of a 0.5 M sodium tungstate aqueous solution was dropped into ethanol and water mixed solution of tungsten acid. Then, 5 mL of polyethylene glycol 300 was added. Further, while a copper nitrate aqueous solution was stirred, the copper nitrate aqueous solution was added to the mixed solution so that the molar ratio of copper to tungsten (Cu/W molar ratio) was 0.13. The solvent was evaporated. Further, the obtained product was heated at 650° C. for 1 hour to obtain copper-added tungsten oxide in Example 2. Moreover, as Comparative Example 2, tungsten oxide was produced by the same method as above except that no copper was added.

Tungsten oxide in Example 2 (tungsten oxide having 0.13 of copper added thereto in terms of the molar ratio to tungsten (Cu/W molar ratio)) and tungsten oxide in Comparative Example 2 (tungsten oxide having no copper added) each were put into a 1.0 M sodium hydroxide aqueous solution, and stability was compared. As a result, tungsten oxide in Comparative Example 2 completely dissolved for 3 hours, but 68% or more of tungsten oxide in Example 2 was left even 3 hours later in terms of the weight of the residue after filtration. Apparently, by adding copper, the environmental resistance of tungsten oxide under an alkaline condition was improved also in Example 2.

Example 3 and Comparative Example 3

Complex Polymerization Method

The method for preparing a copper-added tungsten oxide photocatalyst was changed to the complex polymerization method described below in Example 3. Ammonium tungstate and citric acid were dissolved in an ethylene glycol and methanol mixed solution. Further, while a copper nitrate aqueous solution was stirred, the copper nitrate aqueous solution was added so that the molar ratio of copper to tungsten (Cu/W molar ratio) was 0.13, 0.06, and 0.05. The solvent was evaporated, and the obtained product was heated at 650° C. for 1 hour. Thereby, copper-added tungsten oxides in Example 3 were obtained. As Comparative Example 3, Tungsten oxide produced by the same method as above except that no copper was added.

Tungsten oxides in Example 3 (tungsten oxides having 0.13, 0.06, and 0.05 of copper added thereto in terms of the molar ratio to tungsten (Cu/W molar ratio)) and tungsten oxide in Comparative Example 3 (tungsten oxide having no copper added) each were put into a 1.0 M sodium hydroxide aqueous solution, and stability was compared. As a result, in Comparative Example 3, 20% of tungsten oxide was left after 3 hours in terms of the weight of the residue after filtration. Meanwhile, in Example 3, 92%, 86%, and 79% of tungsten oxides were left after 6 hours in terms of the weight of the residue after filtration at the amount of copper to be added of 0.13, 0.06, and 0.05 in terms of the molar ratio to tungsten (Cu/W molar ratio), respectively. Apparently, by adding copper, the environmental resistance of tungsten oxide under an alkaline condition was improved also in Example 3.

Example 4 and Comparative Examples 4 to 6

Addition of Copper to Tungsten Oxide Powder Sample

To examine the case where copper was added to tungsten oxide powder later, a metal coating solution of copper purchased from Kojundo Chemical Laboratory Co., Ltd. (SYMETRIX, SYM-CU04, for EMOD-coating type material CuO film, copper content of 0.4 M) was diluted twice with butyl acetate, and the diluted solution was added to a tungsten oxide powder (Wako Pure Chemical Industries, Ltd.) so that the molar ratio to tungsten was 0.05. Then, the obtained product was burned at 800° C. for 1 hour to prepare copper-added tungsten in Example 4. The tungsten oxide powder (Wako Pure Chemical Industries, Ltd.) was used as such was as Comparative Example 4. In Comparative Example 5, tungsten oxide powder (Wako Pure Chemical Industries, Ltd.) as such was burned at 800° C. for 1 hour. In Comparative Example 6, a metal coating solution of indium purchased from Kojundo Chemical Laboratory Co., Ltd. that was an element stable under an alkaline condition (SYMETRIX, SYM-INO2, for EMOD-coating type material $InO_{1.5}$ indium content of 0.2 M) was mixed instead of copper with the tungsten oxide powder so that the molar ratio of indium was 0.05, and the obtained product was burned at 800° C. for 1 hour to prepare indium-added tungsten.

Each of these tungsten samples was put into a 1.0 M sodium hydroxide aqueous solution, and the weight of the residue left by filtration after 3.5 hours was examined. Thereby, stability under an alkaline condition was compared. As a result, in Comparative Example 4 (tungsten oxide not treated at all), the weight of the residue was 0% (completely dissolved). In Comparative Example 5 (tungsten oxide burned at 800° C. for 1 hour), the weight of the residue was 23%. In Comparative Example 6 (tungsten oxide having 0.05 of indium added in terms of the molar ratio to tungsten (In/W molar ratio)), the weight of the residue was 9%. Meanwhile, in Example 4 (tungsten oxide having 0.05 of copper added thereto in terms of the molar ratio to tungsten (Cu/W molar ratio)), the weight of the residue was 85%. Thus, apparently, the amount of the residue was increased also in Example 4, and the environmental resistance of tungsten oxide under an alkaline condition was improved by adding copper.

When copper is added to the tungsten oxide powder by impregnation and burning as above, the burning temperature is desirably set at a high temperature of approximately 600° C. to approximately 900° C., and preferably approximately 750° C. to approximately 850° C. When copper is added according to the present invention, copper is not simply carried on the surface of tungsten oxide, but needs to penetrate into the inside of tungsten oxide and be mixed together at a certain extent. For this reason, burning needs to be performed at a relatively high temperature. In such a situation, added copper does not act as a cocatalyst carried on the surface of tungsten oxide. Meanwhile, when copper is simply carried on the surface of the tungsten oxide powder as a cocatalyst by a similar method, by performing burning at a lower temperature of approximately 500° C. to approximately 550° C. as in PTL 1, copper needs to be prevented from penetrating into the inside of tungsten oxide and being mixed together. The optimal burning temperature depends on the conditions such as the form of tungsten oxide (powder or thin film) and the kind of elements to be added.

Consequently, for tungsten oxide, it is thought that addition of the element described in the present invention such as copper leads to significant improvement in environmental resistance.

TABLE 1

Environmental resistance under alkaline condition (copper added)

| | Production method Molar ratio of copper to tungsten | Environmental resistance under alkaline condition (in 1.0M sodium hydroxide aqueous solution) |
|---|---|---|
| Ex. 1 | PA method copper added 0.13 | Visually observed after 2 hours, and no change found |
| Comp. Ex. 1 | PA method no copper added | Visually observed after 2 hours, and 90% or more dissolved |
| Ex. 2 | IE method copper added 0.13 | Weight of residue after 3 hours 68% |
| Comp. Ex. 2 | IE method no copper added | Weight of residue after 3 hours 0% |
| Ex. 3 | Complex polymerization method 0.13 0.06 0.05 | Weight of residue after 6 hours 92% Weight of residue after 6 hours 86% Weight of residue after 6 hours 79% |
| Comp. Ex. 3 | Complex polymerization method no copper added | Weight of residue after 3 hours 20% |
| Ex.4 | Add metal coating solution of copper to tungsten oxide powder, and perform burning 0.05 | Weight of residue after 3.5 hours 85% |
| Comp. Ex. 4 | Tungsten oxide powder not treated | Weight of residue after 3.5 hours 0% |
| Comp. Ex. 5 | Tungsten oxide powder only burning | Weight of residue after 3.5 hours 23% |
| Comp. Ex. 6 | Add metal coating solution of indium to tungsten oxide powder, and perform burning 0.05 | Weight of residue after 3.5 hours 9% |

In Comparative Example 4, tungsten oxide not treated completely dissolved. In contrast, in Comparative Example 5 in which tungsten oxide was burned, the amount of tungsten oxide that did not dissolve and was left increased by 23% in terms of the weight of the residue, and environmental resistance under an alkaline condition was improved by burning in the case where no other element was added. It is thought that the reason is that particles bonded each other and grew in the burning process, and as a result, the surface area decreased and the dissolution rate reduced. However, in the case where copper was added, the weight of the residue in Example 4 was 85%, and extremely greater than the weight of the residue in Comparative Example 5, which was 23%. From this, improvement in environmental resistance under an alkaline condition by adding copper is largely attributed to a factor other than decrease in the surface area by burning.

Further, in Comparative Example 6 in which indium stable under an alkaline condition as copper was added, environmental resistance under an alkaline condition was not improved as much as in Example 4. The weight of the residue was 9%, and smaller than that in Comparative Example 5 in which no element was added. This indicates that improvement in environmental resistance of tungsten oxide under an alkaline condition cannot be achieved only by adding any element stable under an alkaline condition.

<Photocatalytic Activity in Addition of Copper>

Figure 2:
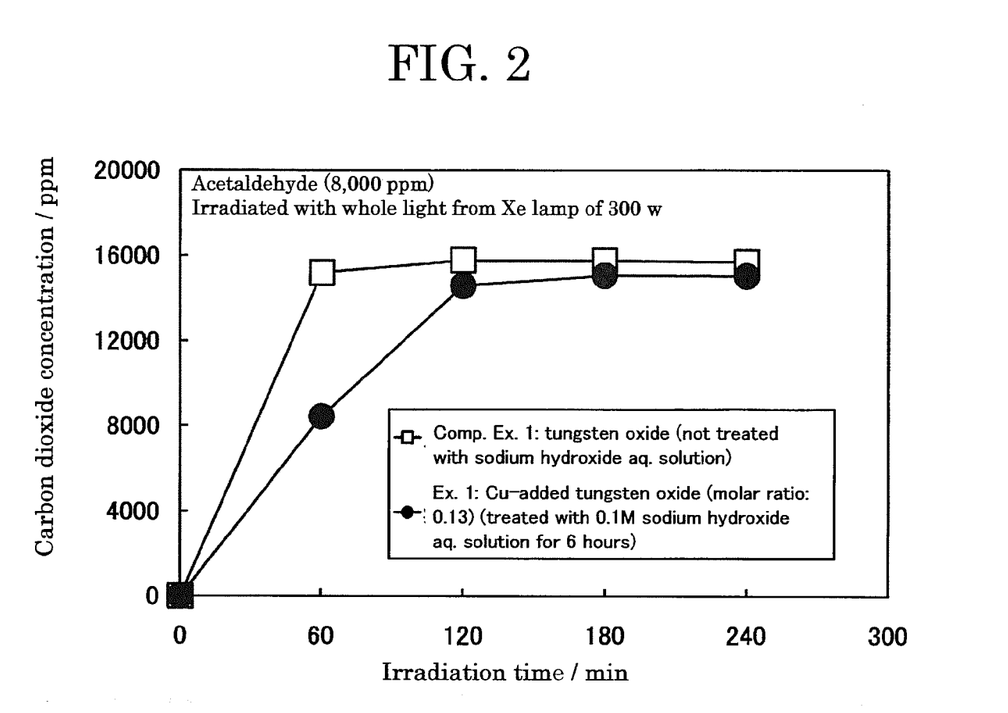
FIG. 2 is a graph showing photocatalytic activity after a tungsten oxide photocatalyst having environmental resistance under an alkaline condition improved by adding copper is treated with an alkaline aqueous solution (change over time in carbon dioxide generated by photodecomposition of acetaldehyde).

To examine photocatalytic activity, 0.1% by weight of platinum as a cocatalyst was added to the tungsten oxide prepared in Example 1 in which tungsten oxide having copper added thereto at 0.13 in terms of the molar ratio to tungsten was treated with the 0.1 M sodium hydroxide aqueous solution for 6 hours. Approximately 150 mg of these materials was placed in a 4.7 mL vial, and approximately 8,000 ppm of acetaldehyde gas was added thereto. The vial was irradiated with light from a Xe lamp of 300 W. By gas chromatography, change over time in the amount of carbon dioxide generated by photodecomposition was monitored. The results are shown in FIG. 2. In the present example, logically, approximately 16,000 ppm of carbon dioxide will generate when the existing acetaldehyde completely decomposes into carbon dioxide.

Apparently from FIG. 2, copper-added tungsten oxide in Example 1 according to the present invention was treated with the 0.1 M sodium hydroxide aqueous solution for 6 hours, but acetaldehyde almost completely decomposed after 120 minutes had passed. In tungsten oxide prepared in Comparative Example 1 and having no copper added, acetaldehyde was subjected to photodecomposition in the same manner without treating tungsten oxide with the sodium hydroxide aqueous solution. The result is shown in FIG. 2. Comparison of Example 1 to Comparative Example 1 shows that the decomposition rate in Example 1 was slightly slower, but copper-added tungsten oxide in Example 1 sufficiently kept photocatalytic activity even after the copper-added tungsten oxide was exposed to an environment under an alkaline condition, and that acetaldehyde could be completely decomposed. In the present Example, decomposition and removal of acetaldehyde in a gaseous phase has been described, but a self-cleaning function using a photocatalyst action to decompose and remove organic substances adhering to the surface of the tungsten oxide photocatalyst can be exhibited using the tungsten oxide photocatalyst according to the present invention. The tungsten oxide prepared in Comparative Example 1 and having no copper added completely dissolves when the tungsten oxide is treated with the sodium hydroxide aqueous solution. For this reason, photocatalytic activity cannot be measured after the alkaline treatment.

Figure 3:
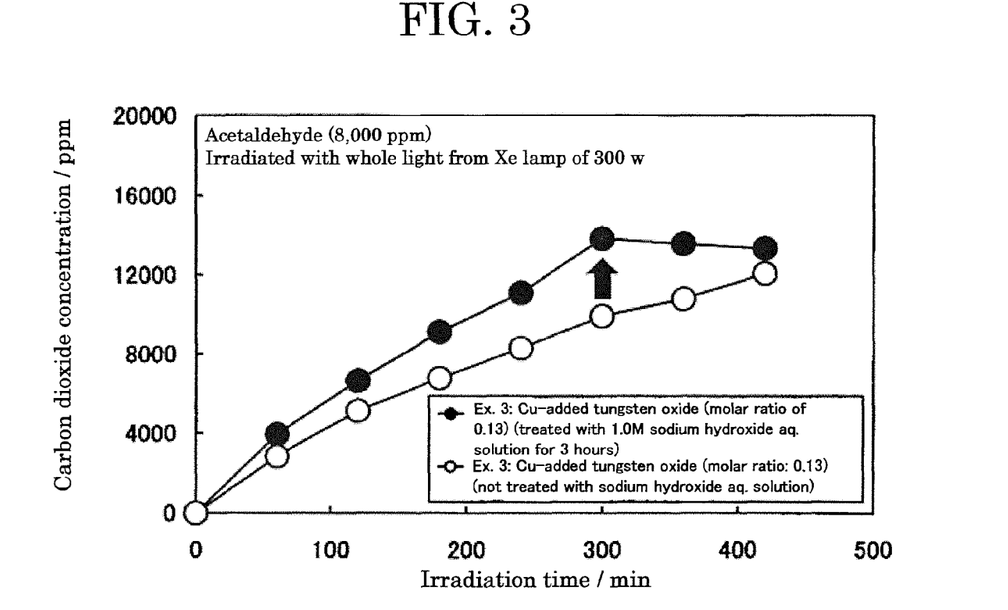
FIG. 3 is a graph showing improvement, by treatment with an alkaline aqueous solution, in photocatalytic activity of the tungsten oxide photocatalyst having environmental resistance under an alkaline condition improved by adding copper (change over time in carbon dioxide generation by photodecomposition of acetaldehyde).

In the tungsten oxide prepared in Example 3 in which tungsten oxide having 0.13 of copper added thereto by the complex polymerization method in terms of the molar ratio to tungsten was treated with the 1.0 M sodium hydroxide aqueous solution for 3 hours and the tungsten oxide prepared in Example 3 in which tungsten oxide having 0.13 of copper added thereto by the complex polymerization method in terms of the molar ratio to tungsten was not treated with the 1.0 M sodium hydroxide aqueous solution, the amount of carbon dioxide generated by decomposition of acetaldehyde was monitored. The results are shown in FIG. 3. As shown by the arrow in FIG. 3, it is found that photocatalytic activity was improved by the alkaline treatment.

<Improvement in Environmental Resistance Under Alkaline Condition by Adding Element Other than Copper>

Examples 5 to 12 and Comparative Examples 4 to 6

Addition of Element Other than Copper to Tungsten Oxide Powder Sample

To examine the effect of adding an element other than copper, similarly to the case of adding copper, each of metal coating solutions of elements to be added that were purchased from Kojundo Chemical Laboratory Co., Ltd. was mixed with a tungsten oxide powder (Wako Pure Chemical Industries, Ltd.) so that the molar ratio to tungsten was 0.05. Then, the mixture was burned at 800° C. for 1 hour to prepare a sample. In the case where each of tantalum, niobium, lanthanum, bismuth, calcium, chromium, manganese, and zinc was added, the mixture was put into a 1.0 M sodium hydroxide aqueous solution. The weight of the residue after filtration after 3.5 hours exceeded 50%. Apparently from comparison with Comparative Examples 4 to 6, environmental resistance of tungsten oxide under an alkaline condition was improved by adding these elements.

TABLE 2

Environmental resistance under alkaline condition (element other than copper added)

| | Element added (molar ratio of 0.05) (metal coating solution of the element is mixed with the tungsten oxide powder, and burning is performed at 800° C. for 1 hour) | Environmental resistance under alkaline condition (weight of residue in 1.0M sodium hydroxide aqueous solution after 3.5 hours) |
|---|---|---|
| Ex. 5 | Tantalum | 94% |
| Ex. 6 | Niobium | 88% |
| Ex. 7 | Lanthanum | 88% |
| Ex. 8 | Bismuth | 97% |
| Ex. 9 | Calcium | 56% |
| Ex. 10 | Chromium | 54% |
| Ex. 11 | Manganese | 57% |
| Ex. 12 | Zinc | 63% |
| Comp. Ex. 4 | Tungsten oxide powder not treated | 0% |
| Comp. Ex. 5 | Tungsten oxide powder only burning | 23% |
| Comp. Ex. 6 | Indium | 9% |

<Photocatalytic Activity in Adding Element Other than Copper>

(1) Photocatalytic Activity in Adding Tantalum or Niobium

Figure 4:
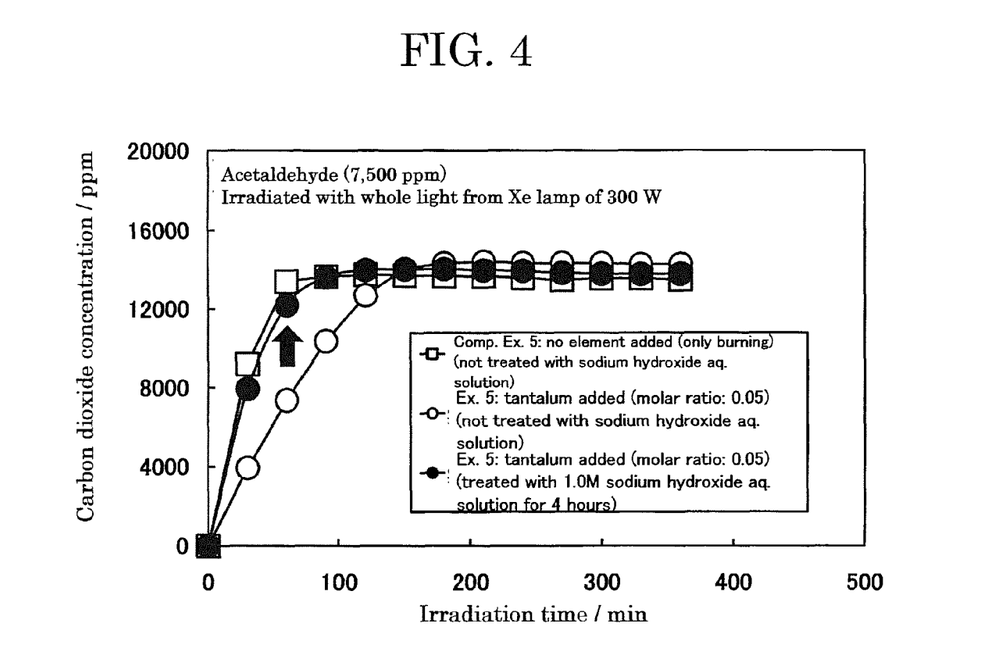
FIG. 4 is a graph showing photocatalytic activity of the tungsten oxide photocatalyst having environmental resistance under an alkaline condition improved by adding tantalum before and after treating the tungsten oxide photocatalyst with an alkaline aqueous solution (change over time in carbon dioxide generation by photodecomposition of acetaldehyde).
Figure 5:
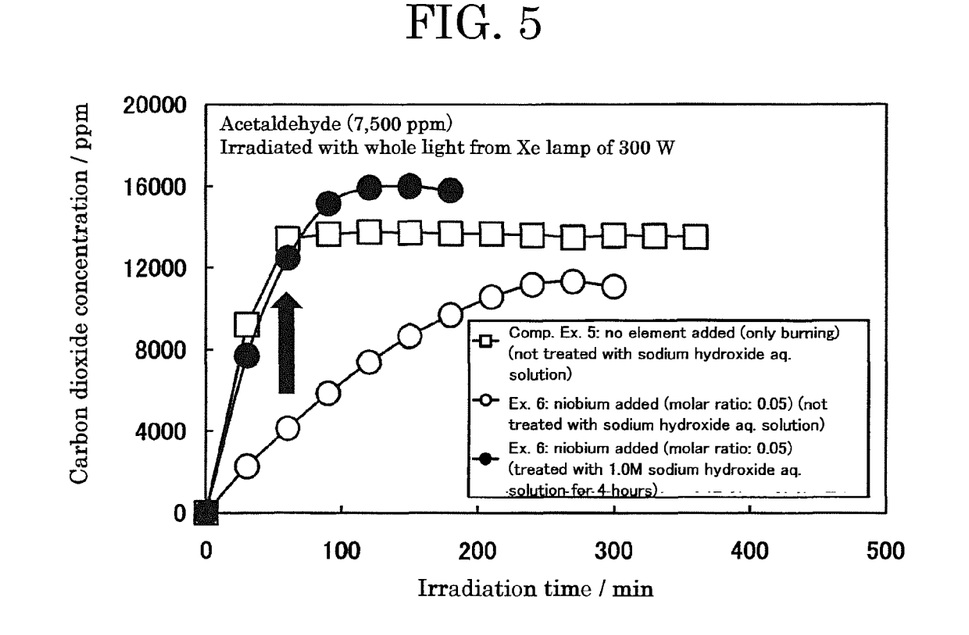
FIG. 5 is a graph showing photocatalytic activity of the tungsten oxide photocatalyst having environmental resistance under an alkaline condition improved by adding niobium before and after treating the tungsten oxide photocatalyst with an alkaline aqueous solution (change over time in carbon dioxide generation by photodecomposition of acetaldehyde).

To examine photocatalytic activity, 0.1% by weight of platinum as a cocatalyst was added to each of the tungsten oxides prepared in Examples 5 and 6 in which one of tantalum and niobium was added at 0.05 in terms of the molar ratio to tungsten. Approximately 150 mg of these materials was placed in a 4.7 mL vial, and approximately 7,500 ppm of acetaldehyde gas was added thereto. The vial was irradiated with light from a Xe lamp of 300 W. By gas chromatography, change over time in the amount of carbon dioxide generated by photodecomposition was monitored. The results are shown in FIGS. 4 and 5. In the present example, logically, approximately 15,000 ppm of carbon dioxide will generate when the existing acetaldehyde completely decomposes into carbon dioxide.

Apparently from FIGS. 4 and 5, it is shown that the tungsten oxide having one of tantalum and niobium added thereto according to the present invention could decompose acetaldehyde, and sufficiently kept photocatalytic activity.

Moreover, the tungsten oxides having tantalum and niobium added thereto respectively in Example 5 and Example 6 were treated with the 1.0 M sodium hydroxide aqueous solution for 4 hours. The treated tungsten oxides were subjected to the same test as above to examine photodecomposition activity of acetaldehyde. The results are shown in FIGS. 4 and 5 in which the results are compared to the results in the case where the treatment with the sodium hydroxide aqueous solution was not performed. As shown by the arrows, it is found that photocatalytic activity was significantly improved by performing the alkaline treatment on tungsten oxides having these elements added to improve environmental resistance under an alkaline environment.

Figure 6:
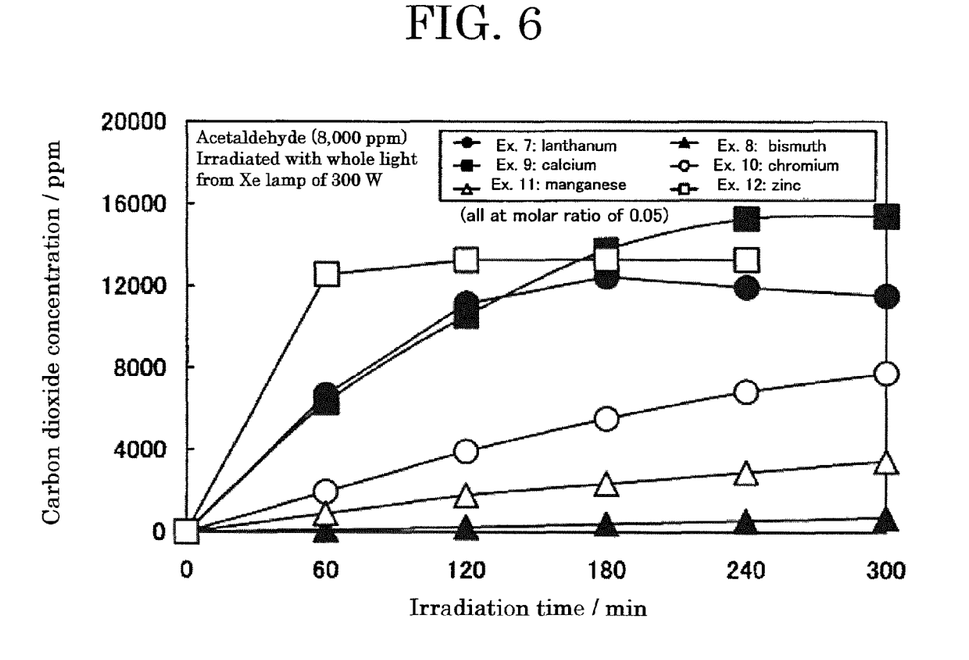
FIG. 6 is a graph showing photocatalytic activity of the tungsten oxide photocatalyst having environmental resistance under an alkaline condition improved by adding each element of lanthanum, bismuth, calcium, chromium, manganese and zinc (and burning at 800° C.) (change over time in carbon dioxide generation by photodecomposition of acetaldehyde).

(2) Photocatalytic Activity in Adding Lanthanum, Bismuth, Calcium, Chromium, Manganese, or Zinc To examine photocatalytic activity, 0.1% by weight of platinum as a cocatalyst was added to each of the tungsten oxides prepared in Examples 7 to 12 in which 0.05 of lanthanum, bismuth, calcium, chromium, manganese, or zinc was added in terms of the molar ratio to tungsten. Approximately 150 mg of these materials was placed in a 4.7 mL vial, and approximately 8,000 ppm of acetaldehyde gas was added thereto. The vial was irradiated with light from a Xe lamp of 300 W. By gas chromatography, change over time in the amount of carbon dioxide generated by photodecomposition was monitored. The results are shown in FIG. 6. In the present example, logically, approximately 16,000 ppm of carbon dioxide will generate when the existing acetaldehyde completely decomposes into carbon dioxide.

Apparently from FIG. 6, it is shown that the tungsten oxides having these elements except for bismuth according to the present invention added thereto could decompose acetaldehyde, and sufficiently kept photocatalytic activity. For bismuth, as described below, photocatalytic activity could be kept by adding bismuth in combination with lanthanum or tantalum.

In addition of bismuth in Example 8 in which photocatalytic activity was low on the above condition, photocatalytic activity was significantly improved by setting the burning temperature after mixing with the metal coating solution at 500° C. Even if the burning temperature was 500° C., the obtained bismuth-added tungsten oxide had sufficient environmental resistance under an alkaline condition.

The environmental resistance of bismuth-added tungsten oxides under an alkaline condition in Example 8 is shown in Table 3 in which the burning temperature was 500° C., and the amount of bismuth to be added was 0.01, 0.05, 0.10, 0.12, and 0.15 in terms of the molar ratio to tungsten. As shown in Table 3, the bismuth-added tungsten oxides had good environmental resistance under an alkaline condition. In Comparative Example 5 shown in Table 3, a commercially available tungsten oxide powder was only burned at 500° C.

TABLE 3

Environmental resistance under alkaline condition (bismuth added)

| | Amount of bismuth to be added (molar ratio) | Environmental resistance under alkaline condition (immersed in 1.0M sodium hydroxide aqueous solution) |
|---|---|---|
| Ex. 8 (bismuth metal coating solution is mixed with tungsten oxide powder, and burning is performed at 500° C. for 1 hour) | 0.01 | Amount of residue after immersion for 24 hours 29% |
| | 0.05 | Amount of residue after immersion for 24 hours 63% |
| | 0.10 | Amount of residue after immersion for 24 hours 85% |
| | 0.12 | Amount of residue after immersion for 3 hours 91% |
| | 0.15 | Amount of residue after immersion for 3 hours 90% |
| Comp. Ex. 5 (burned at 500° C. for 1 hour) | Not added (only burning) | Amount of residue after immersion for 3 hours 0% |

Figure 7:
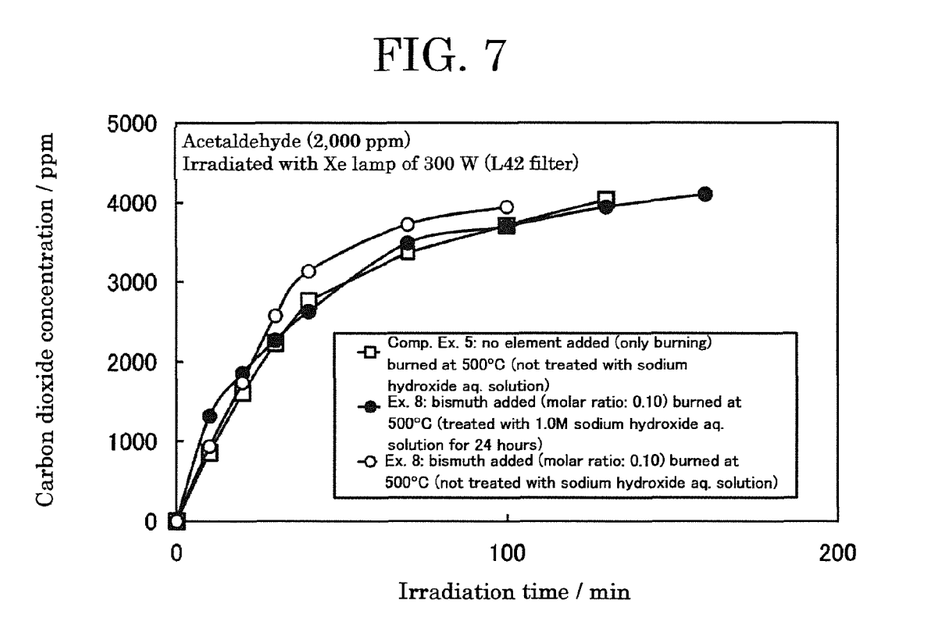
FIG. 7 is a graph showing photocatalytic activity of the tungsten oxide photocatalyst having environmental resistance under an alkaline condition improved by adding bismuth (and burning at 500° C.) (change over time in carbon dioxide generation by photodecomposition of acetaldehyde).

To examine the photocatalytic activity of the bismuth-added tungsten oxide obtained in Example 8 by setting the burning temperature at 500° C. as described above in which the amount of bismuth to be added was 0.10 in terms of the molar ratio to tungsten, 0.1% by weight of platinum as a cocatalyst was added to the bismuth-added tungsten oxide. Approximately 2,000 ppm of acetaldehyde gas was added thereto. The obtained sample was irradiated with visible light from a Xe lamp of 300 W through an L42 filter. By gas chromatography, change over time in the amount of carbon dioxide generated by photodecomposition was monitored. In the bismuth-added tungsten treated by immersing the bismuth-added tungsten in the 1.0 M sodium hydroxide aqueous solution for 24 hours, the photocatalytic activity was also examined in the same manner. Moreover, in the above described Comparative Example 5 in which the burning temperature was 500° C., the photocatalytic activity was also examined for comparison in the same manner. The results are shown in FIG. 7. In the present example, logically, approximately 4,000 ppm of carbon dioxide will generate when the existing acetaldehyde completely decomposes into carbon dioxide. Apparently from FIG. 7, it is shown that the tungsten oxide having bismuth added thereto on this condition and the alkali treated tungsten oxide (Example 8) almost completely decomposed acetaldehyde by irradiation with visible light for approximately 150 minutes, the decomposition rate was substantially the same as that of tungsten oxide only burned at 500° C. and having no element added thereto (Comparative Example 5), and the photocatalytic activity was sufficiently kept.

Thus, when bismuth is added by impregnating the tungsten oxide powder with the metal coating solution or the like and performing burning, the burning temperature is preferably 400° C. to 700° C., and more preferably 450° C. to 550° C., and different from the preferable burning temperature when copper is added by the same method as described above. This shows that the optimal burning temperature depends on the kind of elements to be added.

Figure 8:
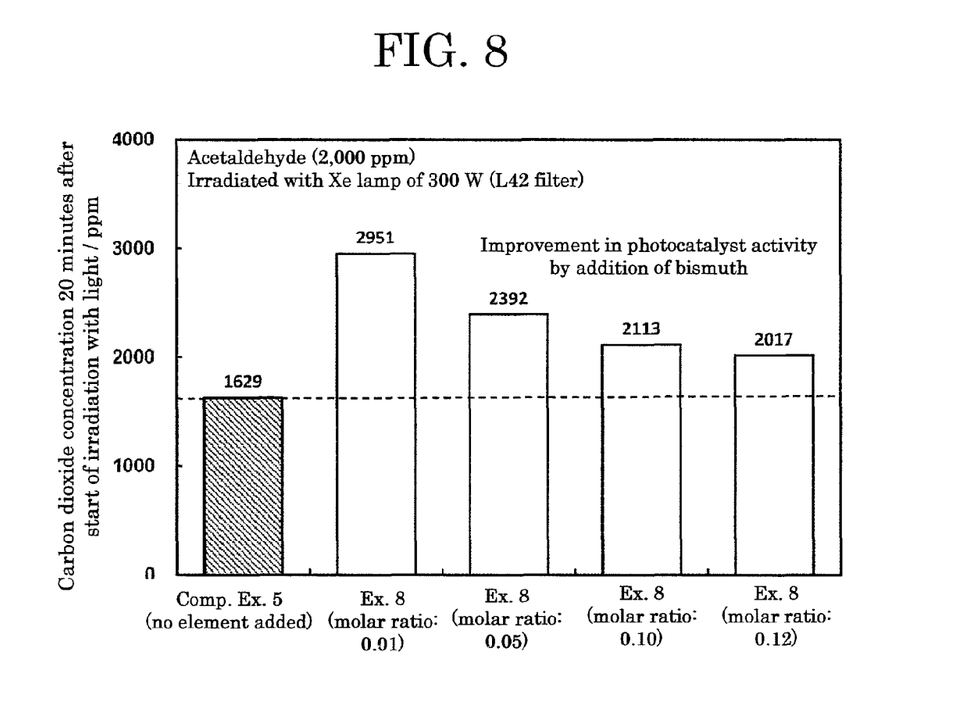
FIG. 8 is a graph showing improvement in photocatalytic activity of the tungsten oxide photocatalyst by adding bismuth (and burning at 500° C.) (comparison of the amount of carbon dioxide generated by photodecomposition of acetaldehyde for 20 minutes from starting irradiation with light among photocatalysts having different amounts of bismuth to be added).

Further, in Example 8 in which the burning temperature was 500° C., and the amount of bismuth to be added was 0.01 to 0.12 in terms of the molar ratio to tungsten, 0.1% by weight of platinum as a cocatalyst was added. Approximately 2,000 ppm of acetaldehyde gas was added thereto. The obtained sample was irradiated with visible light from a Xe lamp of 300 W through an L42 filter. The amount of carbon dioxide generated after 20 minutes was examined. For comparison, in Comparative Example 5 in which the burning temperature was 500° C., the amount of carbon dioxide generated was examined in the same manner. The results are shown in FIG. 8. It is found that the amount of carbon dioxide generated by decomposition of acetaldehyde because of addition of bismuth was more increased than that in Comparative Example 5 when no element was added, and the photocatalytic activity of tungsten oxide was improved by addition of bismuth. In the regions in which the amount of bismuth to be added was relatively small, photocatalytic activity was more improved than that when no element was added. In this case, the amount of bismuth to be added was preferably 0.005 to 0.15, and more preferably 0.01 to 0.12 in terms of the molar ratio to tungsten. Apparently from Table 3, comparing to the case where no element was added, environmental resistance under an alkaline condition was improved even at an amount of bismuth to be added of relatively small in which photocatalytic activity was improved.

<Improvement in Environmental Resistance Under an Alkaline Condition when Element Other than Copper is Added to Tungsten Oxide in Thin Film Form (Addition of Elements Alone or in Combination)>

Addition of Either Lanthanum or Bismuth, and Addition of Both Thereof.

The polytungsten peroxide produced by the PA method that was used in Example 1 was applied onto a conductive glass by spin coating to form a film on the conductive glass, and the workpiece was burned at 500° C. Thereby, a tungsten oxide thin film was made. The metal coating solution of lanthanum or bismuth was applied onto the thin film by spin coating, and the thin film was burned at 500° C. Thus, Example 13 and Example 14 were obtained. Moreover, first, a metal coating solution of lanthanum was applied onto a tungsten oxide thin film by spin coating, and the thin film was burned at 500° C. Then, a diluted metal coating solution of bismuth was applied onto the thin film by spin coating, and the thin film was further burned at 500° C. Thereby, a tungsten oxide thin film having lanthanum and bismuth both added thereto was made. The coating solution was prepared by diluting the metal coating solution of bismuth (concentration of bismuth as a raw solution of 0.5 M) with butyl acetate, and applied by spin coating. The concentration was 0.2 M in Example 15, 0.1 M in Example 16, 0.04 M in Example 17, and 0.02 M in Example 18. In Examples 16 to 18, further chloroplatinic acid was applied, and burning was performed at 300° C. Thus, platinum was carried as a cocatalyst. A tungsten oxide thin film was made as Comparative Example 7 by the same method as above without adding any element.

To examine improvement in environmental resistance under an alkaline condition, the thin film was put into a 1.0 M sodium hydroxide aqueous solution, and the amount of the residue of tungsten oxide was measured after 30 minutes had passed. The results are shown in Table 3. In Example 13 in which lanthanum was added, approximately 90% of tungsten oxide was left. In Example 14 in which bismuth was added, approximately 80% of tungsten oxide was left. Further, in all of Examples 15 to 18 in which both of lanthanum and bismuth were added, 90% or more of tungsten oxide was left. Meanwhile, in Comparative Example 7 in which no element was added, tungsten oxide was not left at all. From this, it is found that also in tungsten oxide in a thin film form, environmental resistance under an alkaline condition was improved by adding the element. It is also found that environmental resistance under an alkaline condition was also improved by adding a plurality of elements in combination.

TABLE 4

Environmental resistance under alkaline condition (tungsten oxide thin film)

| | Element added (metal coating solution of the element was applied onto tungsten oxide thin film by spin coating, and burning was performed) | Environmental resistance under alkaline condition (amount of residue after treatment with 1.0M sodium hydroxide aqueous solution for 30 minutes) |
|---|---|---|
| Ex. 13 | Lanthanum | 90% |
| Ex. 14 | Bismuth | 80% |
| Ex. 15 | Lanthanum + bismuth (0.2M) | 92% |
| Ex. 16 | Lanthanum + bismuth (0.1M) + platinum | 96% |
| Ex. 17 | Lanthanum + bismuth (0.04M) + platinum | 91% |
| Ex. 18 | Lanthanum + bismuth (0.02M) + platinum | 97% |
| Comp. Ex. 7 | Tungsten oxide thin film only | 0% |

<Photocatalytic Activity when Element Other than Copper is Added to Tungsten Oxide In Thin Film Form>

Figure 9:
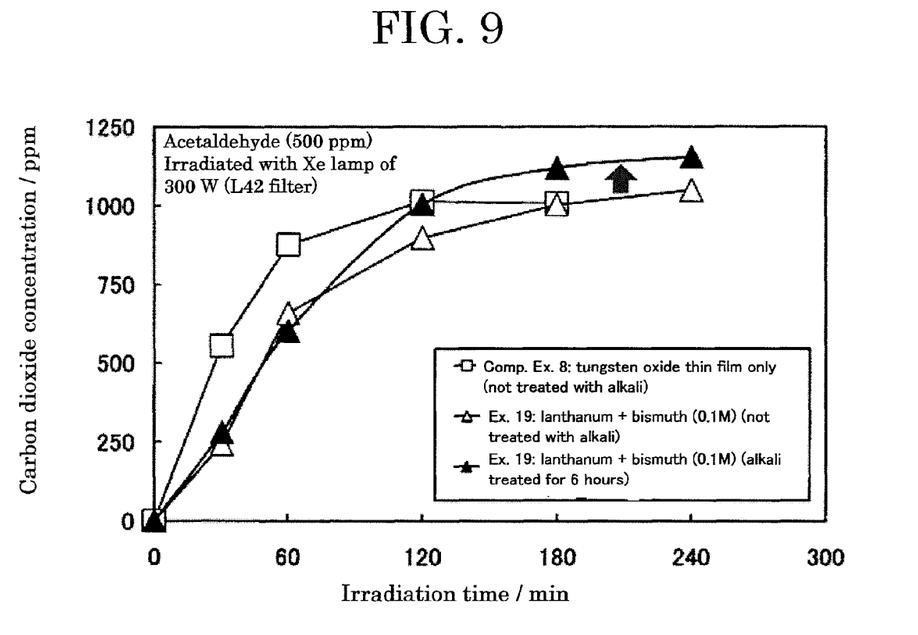
FIG. 9 is a graph showing photocatalytic activity of the tungsten oxide photocatalyst thin film having environmental resistance under an alkaline condition improved by adding lanthanum and bismuth in combination before and after treating the tungsten oxide photocatalyst thin film with an alkaline aqueous solution (change over time in carbon dioxide generation by photodecomposition of acetaldehyde).
Figure 10:
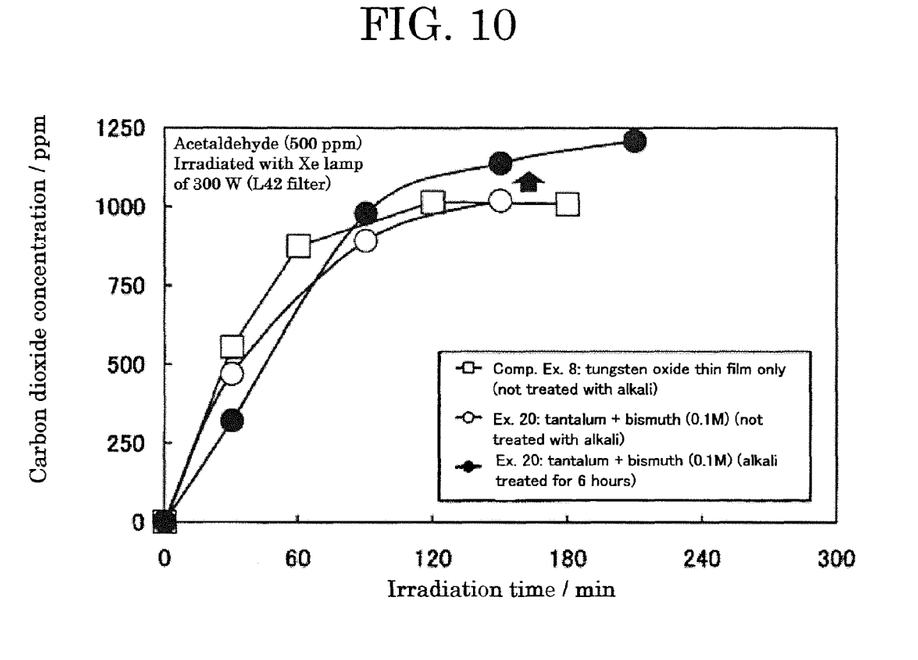
FIG. 10 is a graph showing photocatalytic activity of the tungsten oxide photocatalyst thin film having environmental resistance under an alkaline condition improved by adding tantalum and bismuth in combination before and after treating the tungsten oxide photocatalyst thin film with an alkaline aqueous solution (change over time in carbon dioxide generation by photodecomposition of acetaldehyde).

To examine photocatalytic activity, first, platinum as a cocatalyst was used to form a film on a conductive glass, and tungsten oxide, lanthanum, and bismuth (diluted to be 0.1 M) were sequentially formed on the film by the above method. The obtained film was used as Example 19. A film formed using tantalum instead of lanthanum was used as Example 20. Using these films treated with a commercially available alkaline mold removing agent (JOHNSON COMPANY, LIMITED, Kabikiller: concentration of sodium hydroxide of 0.125 M) for 6 hours and those not treated, photodecomposition of acetaldehyde was performed. Approximately 500 ppm of acetaldehyde gas was added. The obtained sample was irradiated with light from a Xe lamp of 300 W through an L42 filter. By gas chromatography, change over time in the amount of carbon dioxide generated by photodecomposition was monitored. For comparison, a film in Comparative Example 8 was formed by forming a film on a conductive glass using platinum as a cocatalyst first and forming a film using only tungsten oxide thereon, and photodecomposition was performed in the same manner. The results are shown in FIGS. 9 and 10. In the present example, logically, approximately 1,000 ppm of carbon dioxide will generate when the existing acetaldehyde completely decomposes into carbon dioxide.

It is found out that the photocatalytic activity including after exposure to an alkali was not lost and the photocatalytic activity was more improved by the alkaline treatment in Example 19 in which lanthanum and bismuth were both added and in Example 20 in which tantalum and bismuth were both added than the photocatalytic activity in Comparative Example 8. In the present Example, decomposition and removal of acetaldehyde in a gaseous phase has been described similarly to the case of the powder form. A self-cleaning function using a photocatalyst action to decompose and remove organic substances adhering to the surface of the tungsten oxide photocatalyst thin film can also be exhibited using the tungsten oxide photocatalyst thin film according to the present invention.

INDUSTRIAL APPLICABILITY

By using the method for improving the environmental resistance of the visible light-responsive photocatalyst under an alkaline condition according to the present invention, copper-added tungsten oxide as the visible light-responsive photocatalyst can be used for walls of sinks, bathrooms, and toilets and surfaces of other products used in sinks, bathrooms, and toilets in which the visible light-responsive photocatalyst having low environmental resistance cannot be used because these walls and surfaces are exposed to a detergent or the like to become alkaline or acidic. By using the visible light-responsive photocatalyst as a self-cleaning material in these places, the surfaces of the places can be kept clean.

The invention claimed is:

1. A method for improving environmental resistance of tungsten oxide under an alkaline condition without losing photocatalytic function thereof caused by visible light, the method comprising one of the following combinations:
   (a) impregnating a tungsten oxide powder with a metal coating solution of at least one element to form a powder sample, and
   burning the powder sample; or
   (b) applying a metal coating solution of at least one element to a tungsten oxide thin film to form a coated film, and
   burning the coated film to form a tungsten oxide photocatalyst; and
   wherein the at least one element is at least one selected from the group consisting of lanthanum, bismuth, and calcium, and immersing the tungsten oxide photocatalyst in an alkaline aqueous solution for a predetermined time after burning.

2. The method according to claim 1, wherein an amount of the at least one element is 0.005 to 0.50 in terms of a molar ratio to tungsten.

3. The method according to claim 2, wherein the amount of the at least one element is 0.01 to 0.15 in terms of the molar ratio to tungsten.

4. The method according to claim 1, wherein the at least one element contains bismuth, and
   wherein the burning is conducted at a temperature in the range of 400° C. to 700° C. to improve photocatalytic activity thereof.

5. The method according to claim 1, further comprising the step of:
   subjecting the tungsten oxide photocatalyst to an alkaline treatment to improve photocatalytic activity thereof.

6. A method for forming a tungsten oxide photocatalyst comprising one of the following combinations:
   (a) impregnating a tungsten oxide powder with a metal coating solution of at least one element to form a powder sample, and
   burning the powder sample; or
   (b) applying a metal coating solution of at least one element to a tungsten oxide thin film to form a coated film, and
   burning the coated film to form a tungsten oxide photocatalyst; and
   wherein the at least one element is at least one selected from the group consisting of lanthanum, bismuth, and calcium, and immersing the tungsten oxide photocatalyst in an alkaline aqueous solution for a predetermined time after burning.

7. The method according to claim 6, wherein an amount of the at least one element is 0.005 to 0.50 in terms of a molar ratio to tungsten.

8. The method according to claim 7, wherein the amount of the at least one element is 0.01 to 0.15 in terms of a molar ratio to tungsten.

9. The method according to claim 6,
wherein the at least one element is bismuth, and
wherein the burning is at a temperature in the range of 400° C. to 700° C.

10. The method according to claim 9,
wherein the amount of the at least one element is 0.01 to 0.15 in terms of the molar ratio to tungsten.

* * * * *